(12) United States Patent
Daniels

(10) Patent No.: US 7,677,205 B2
(45) Date of Patent: Mar. 16, 2010

(54) PORTABLE OR STATIONARY ANIMAL ALLEY

(76) Inventor: Danny D. Daniels, 159 N. Cedar St., Ainsworth, NE (US) 69210

(*) Notice: Subject to any disclaimer, the term of this patent is extended or adjusted under 35 U.S.C. 154(b) by 417 days.

(21) Appl. No.: 11/899,919

(22) Filed: Sep. 7, 2007

(65) Prior Publication Data

US 2009/0064941 A1 Mar. 12, 2009

(51) Int. Cl.
*A01K 29/00* (2006.01)
(52) U.S. Cl. .................... 119/843; 119/840; 119/519
(58) Field of Classification Search .............. 119/843, 119/840, 519, 520, 524, 14.03, 412
See application file for complete search history.

(56) References Cited

U.S. PATENT DOCUMENTS

| | | | | |
|---|---|---|---|---|
| 3,024,766 A * | 3/1962 | Eveland | ................ | 119/520 |
| 3,246,631 A * | 4/1966 | Holm | ................ | 119/14.03 |
| 3,828,733 A * | 8/1974 | Correia | ................ | 119/14.03 |
| 3,885,528 A * | 5/1975 | Vandenberg | ............ | 119/14.03 |
| 5,285,746 A * | 2/1994 | Moreau | ................ | 119/14.03 |
| 5,782,199 A * | 7/1998 | Oosterling | ............ | 119/14.02 |
| 6,571,730 B1 * | 6/2003 | Norberg | ................ | 119/14.03 |
| 7,086,348 B2 * | 8/2006 | Guo | ................ | 119/14.02 |
| 7,216,605 B2 * | 5/2007 | Cupps | ................ | 119/412 |
| 7,296,536 B2 * | 11/2007 | Umegard | ................ | 119/14.03 |
| 2006/0254523 A1 * | 11/2006 | Guo | ................ | 119/14.03 |

* cited by examiner

*Primary Examiner*—Yvonne R. Abbott
(74) *Attorney, Agent, or Firm*—Dennis L. Thomte; Thomte Patent Law Office LLC

(57) ABSTRACT

An alley for processing animals such as cattle or buffaloes is described which includes a pair of spaced-apart alleys at the entrance end of the alley and a single alley at the exit end of the pair of alleys at the entrance end of the alley. The outer side walls of the alleys are easily adjusted to vary the width thereof thereby enabling the alley to accommodate animals of different sizes. Rear-up prevention device mechanisms are also provided in each of the alleys to prevent the animals from raring up and falling over backwards. The alley may be either portable or stationary.

14 Claims, 14 Drawing Sheets

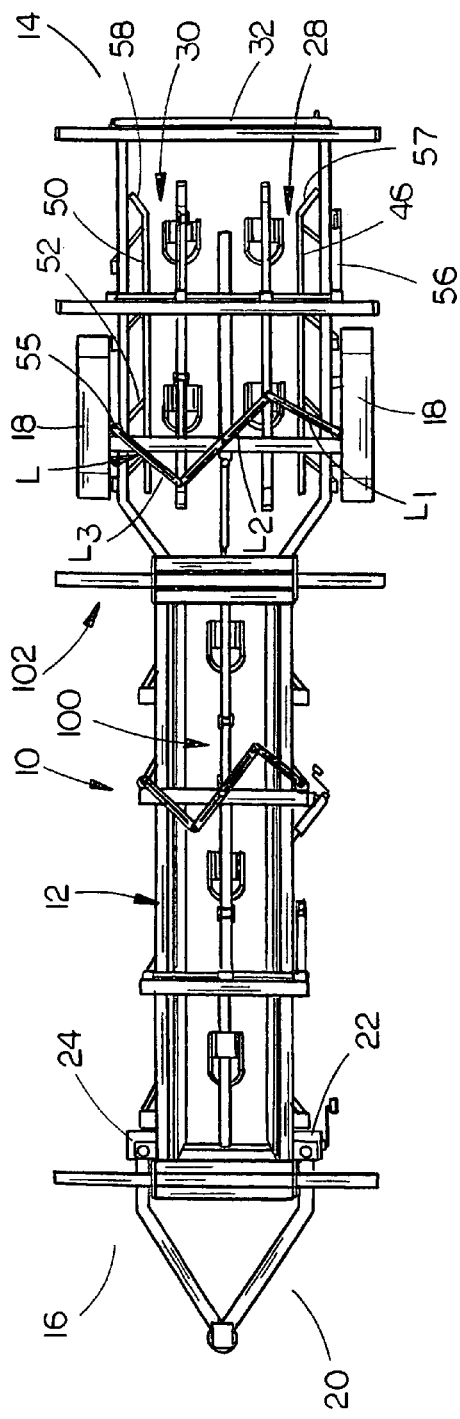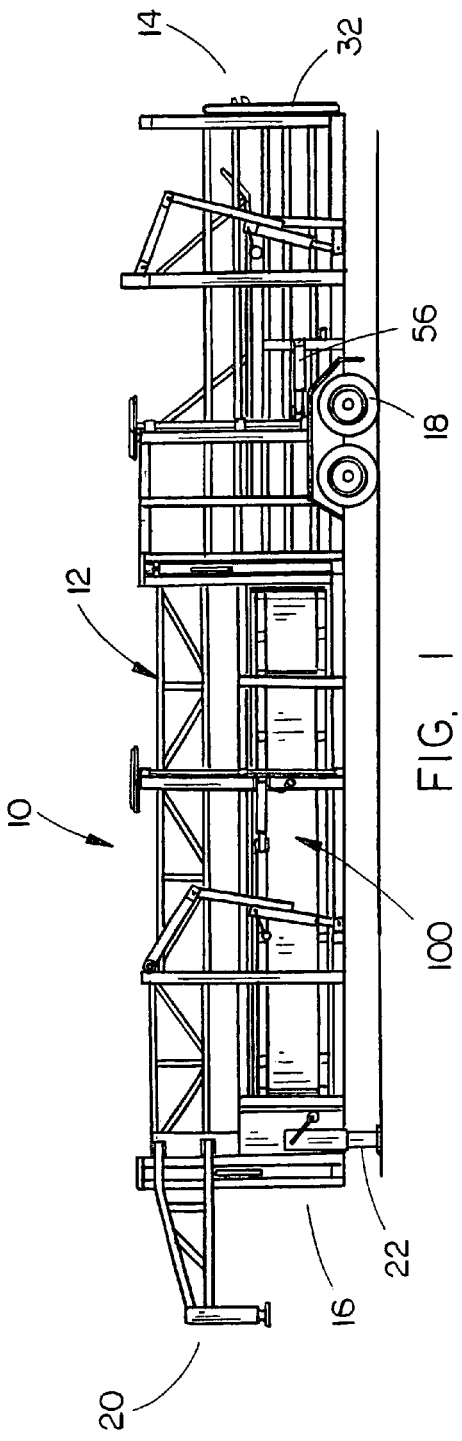

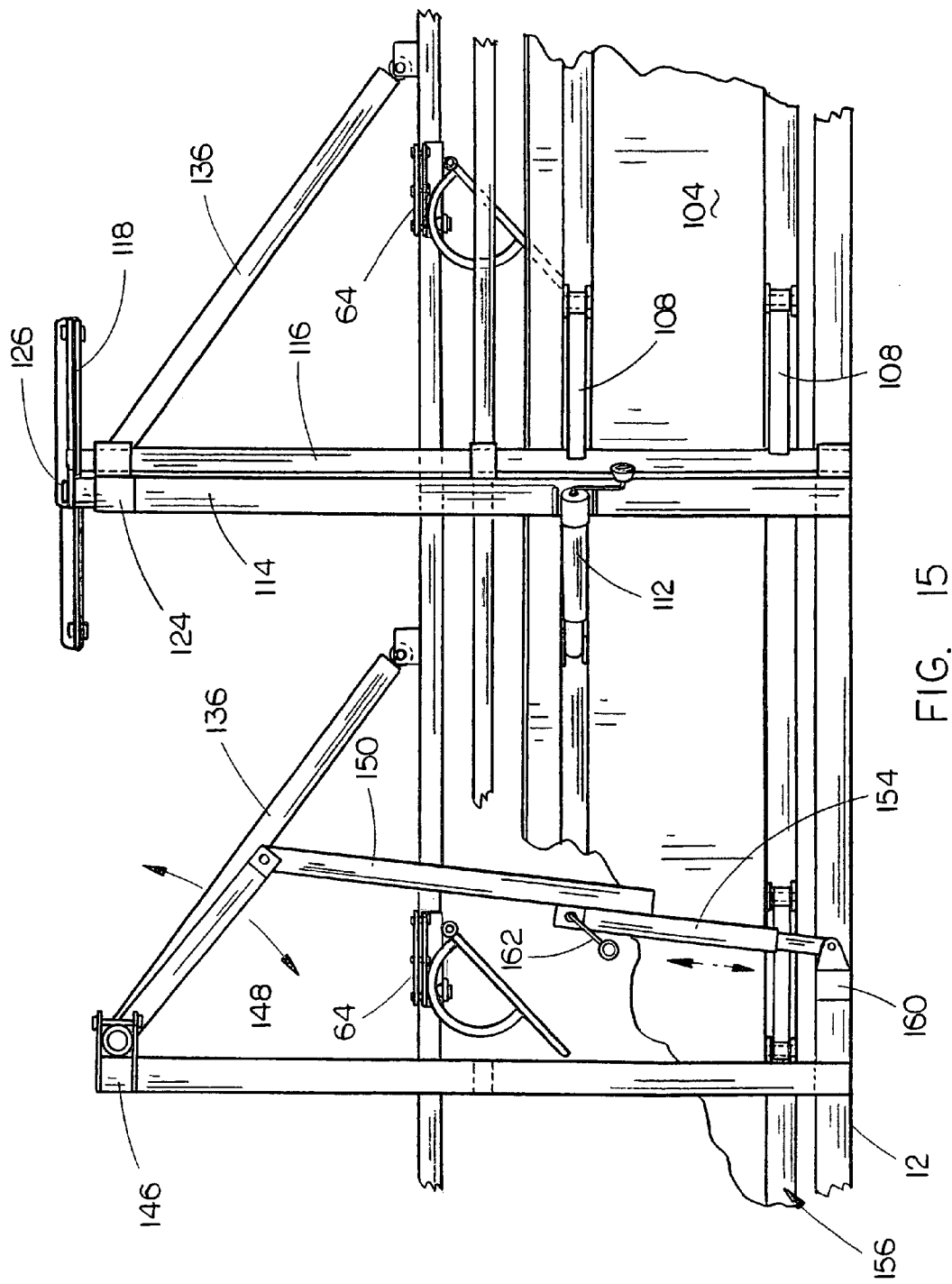

PORTABLE OR STATIONARY ANIMAL ALLEY

BACKGROUND OF THE INVENTION

1. Field of the Invention

This invention relates to a portable or stationary animal alley or alleyway and more particularly to a portable or stationary animal alley or alleyway which includes a frame having first and second side-by-side alleys at the entrance end thereof which communicate with the entrance end of a third alley. The first and second alleys permit animals to enter the entrance ends thereof in a side-by-side relationship with those animals then being selectively individually moved to the entrance end of the third alley.

2. Description of the Related Art

Many types of animal alleys or alleyways have been previously provided to enable cattle producers and veterinarians to work on animals such as cattle, buffaloes, etc. for vaccinations, artificial inseminations, pregnancy tests, etc. In some cases, the alleys are used in auction barns wherein the cattle are moved through an auction ring for sale. To the best of applicant's knowledge, all of the prior art alleys only permit one animal at a time to enter the alley, which makes it difficult to efficiently handle the animals due to the reluctance of the animals to enter a place of confinement by themselves. Further, to the best of applicant's knowledge, the prior art alleys are not able to easily accommodate animals of different sizes nor do they include efficient rear-up preventer mechanisms which prevent the animals from raring up over backwards in the alley. It is also believed that the prior art alleys require more manpower than is desirable.

SUMMARY OF THE INVENTION

An animal alley is disclosed for handling animals such as cattle or buffaloes and comprises a main frame which may be either stationary or portable. If portable, the main frame will be provided with wheels and will have a hitch at the forward end thereof for attachment to a prime mover such as a truck or the like. When detached from the truck, the front end of the main frame will be supported by at least a pair of jacks.

The main frame includes an entrance end and an exit end. The entrance end of the main frame has first and second spaced-apart infeed alleys, each of which have an entrance end and an exit end, defined by outer side walls and a divider wall therebetween so that two animals may enter the entrance end of the first and second alleys in a side-by-side manner. A spring-loaded swinging gate is hingedly secured to the forward end of the divider wall which selectively closes either the exit end of the first infeed alley or the exit end of the second infeed alley. The main frame also includes a first framework which extends over the upper end of the first and second alleys. A first animal rear-up preventer mechanism is secured to the first framework above the first alley so that an animal in the first alley cannot rear up over backwards. A second animal rear-up preventer mechanism is secured to the first framework above the second alley so that an animal in the second alley cannot rear up over backwards.

The main frame also includes a third alley, having an entrance end and an exit end, with the entrance end of the third alley communicating with the exit ends of the first and second alleys. The third alley has a width which is less than the combined width of the first and second alleys. The third alley is defined by horizontally spaced-apart side walls. The main frame includes a second framework which extends over the upper end of the third alley. The spring-loaded swinging gate at the exit end of the first and second alleys permits the animals in the first and second alleys to enter the entrance end of the third alley in a single file manner. A third animal rear-up preventer mechanism is secured to the second framework above the third alley so that an animal in the third alley cannot rear up over backwards. The third alley also includes spaced-apart outer side walls. The main frame includes a gate which selectively closes the exit end of the third alley.

The first, second and third animal rear-up preventer mechanisms are selectively vertically adjustable to accommodate various sizes of animal. The outer side walls of the first and second alleys are selectively horizontally adjustable to accommodate various sizes of animals. The outer sidewalls of the third alley are also selectively horizontally adjustable to accommodate various sizes of animals.

It is a principal object of the invention to provide an improved animal alley for handling animals such as cattle and buffalo.

A further object of the invention is to provide an animal alley which has a pair of alleys at the entrance end thereof which permits a pair of animals to enter the alley in a side-by-side relationship.

Still another object of the invention is to provide an animal alley including first, second and third alleys with the side walls thereof being selectively horizontally adjustable to accommodate various sizes of animals.

Still another object of the invention is to provide an animal alley for handling animals including animal rear-up preventer mechanisms positioned above first, second and third alleys.

Yet another object of the invention is to provide an animal alley for handling animals wherein rear-up preventer mechanisms are positioned above the alleys thereof with the rear-up preventer mechanisms being selectively vertically adjustable to accommodate various sizes of animals.

Still another object of the invention is to provide an animal alley which may be either portable or stationary.

Still another object of the invention is to provide an animal alley which when portable has a hitch at the forward end thereof which may be pivotally moved out of the way when the alley is being utilized to handle animals.

Still another object of the invention is to provide an animal alley which has limited sheeting at the sides thereof so that the cattle can see out both sides of the alley so they move more freely therethrough.

Still another object of the invention is to provide an animal alley including first, second and third alleys therein wherein the sides thereof are vertically disposed so that the animals may stand naturally.

Still another object of the invention is to provide an animal alley for handling animals which is easily adjusted to handle animals of various sizes.

These and other objects will be apparent to those skilled in the art.

BRIEF DESCRIPTION OF THE DRAWINGS

FIG. 1 is a side view of the animal alley of this invention shown in the portable style;

FIG. 2 is a top view of the alley of FIG. 1;

FIG. 15 is a partial side view illustrating a portion of the third alley.

DETAILED DESCRIPTION OF THE INVENTION

Figure 6:
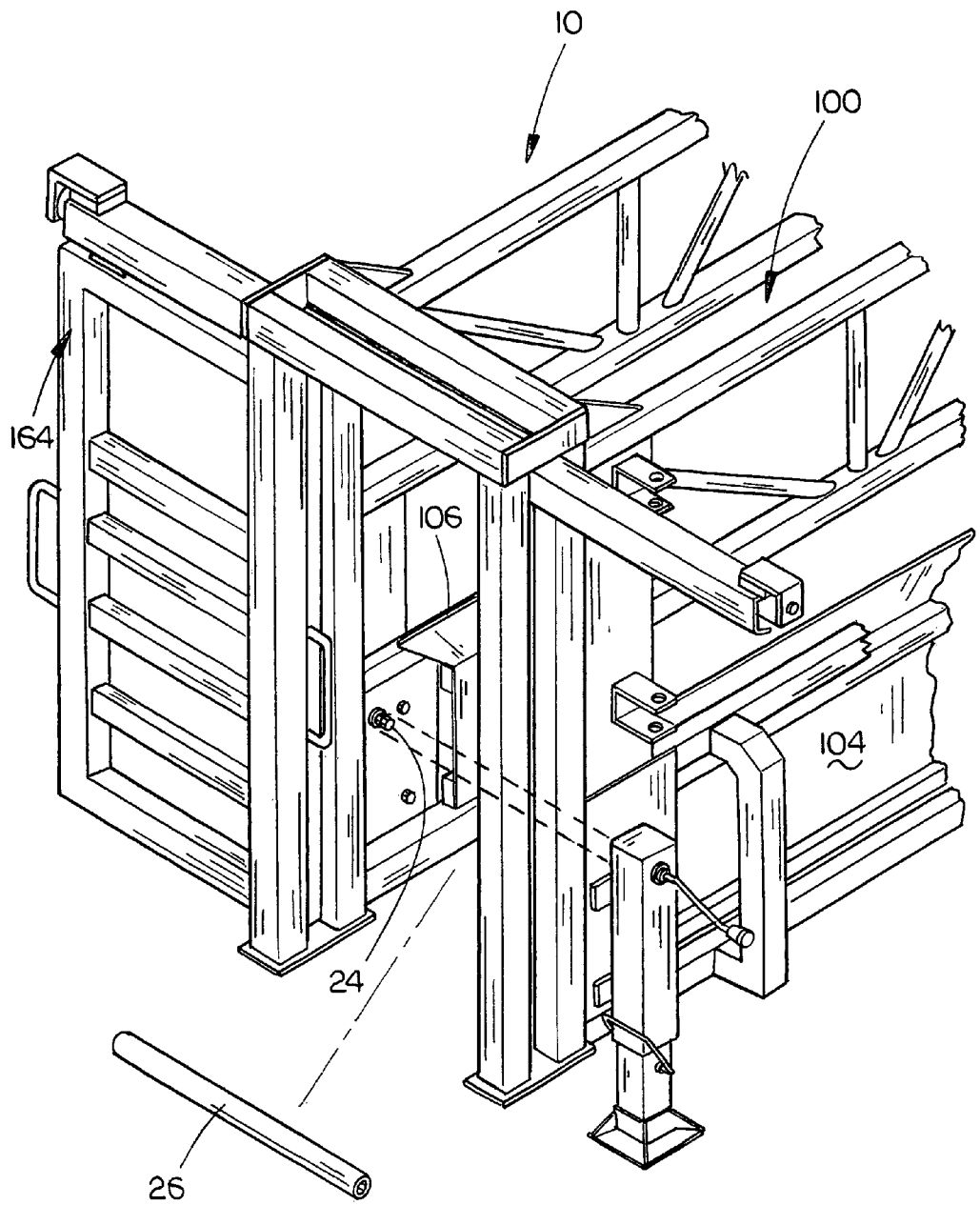
FIG. 6 is a partially exploded perspective view of the exit end of the alley which illustrates the manner in which a pair of jacks are interconnected so that they may be simultaneously operated.

The animal alley of this invention is referred to generally by the reference numeral 10 and is designed to handle animals such as cattle or buffaloes. The alley 10 may be either portable or stationary. Alley 10 includes a main frame 12 which includes an entrance end 14 and an exit end 16. If the alley 10 is portable, the main frame 12 will be supported by wheels 18 at each side thereof and will have a suitable hitch mechanism 20 at the forward or exit end thereof for attachment to a prime mover such as a truck or the like. The hitch mechanism 20 may be of any type such as a fifth wheel hitch mechanism, as illustrated in the drawings, or may be a trailer hitch if so desired. When the alley 10 is disconnected from the main frame 12, a pair of jacks 22 and 24 will be provided at the forward end of the main frame 12 as illustrated in FIGS. 1 and 2 and will be used to support the forward or exit end of the alley 10 as illustrated in FIG. 1. If the alley 10 is stationary, the hitch mechanism 20 will not be needed nor will the jacks 22 and 24 or wheels 18 be needed. If jacks 22 and 24 are used, they will be operatively interconnected by means of a removable connecting rod 26 so that the actuation of jack 22 will cause the actuation of jack 24 as seen in FIG. 6.

Figure 7:
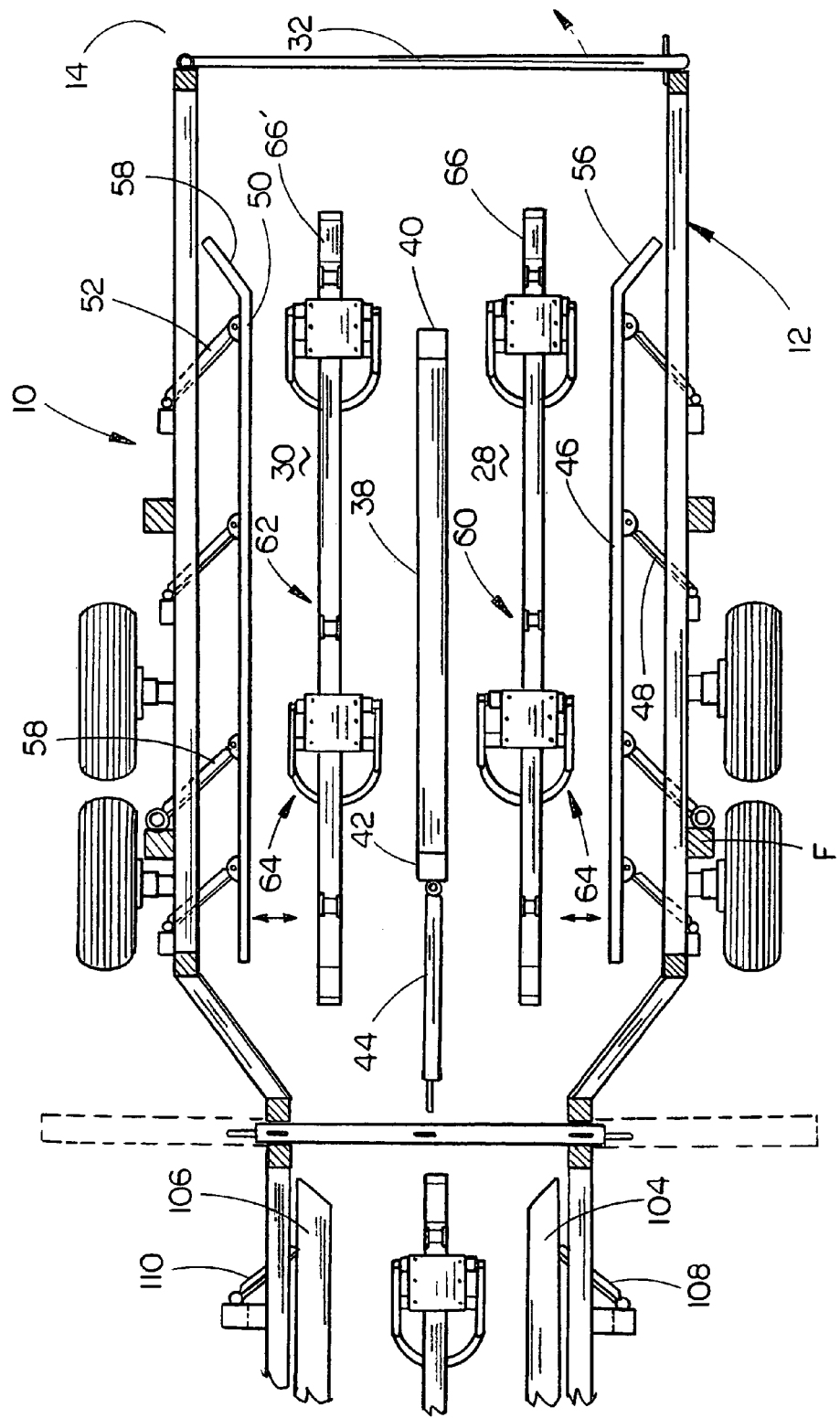
FIG. 7 is a partial top view of the alley illustrating the manner in which the outer side walls of the first and second alleys are selectively horizontally adjustable to accommodate various sizes of animals.

As seen in FIG. 7, the rearward or entrance end 14 of main frame 12 is wider than the forward portion of main frame 12 so as to define or provide a first alley 28 and a second alley 30 which are positioned in a side-by-side relationship to enable a pair of animals to simultaneously enter the entrance end 14 of the alley 10 in a side-by-side manner which makes the animals feel more at ease. The entrance end 14 of alley 10 is selectively closed by means of a gate 32. In normal use, gate 32 will normally be swung open and the entrance end 14 of the alley 10 will be in communication with a bud box system generally referred to by the reference numeral 34. The exit end of the bud box 34 is selectively closed by means of a panel 36 in conventional fashion or by the gate 32.

A seen in FIG. 7, the alleys 28 and 30 are separated by means of a divider wall 38 having an entrance end 40 and an exit end 42. A spring-loaded gate 44 is hingedly or pivotally connected to the exit end 42 of divider wall 38 as will be described hereinafter and is normally in the position illustrated in FIG. 7.

Figure 5:
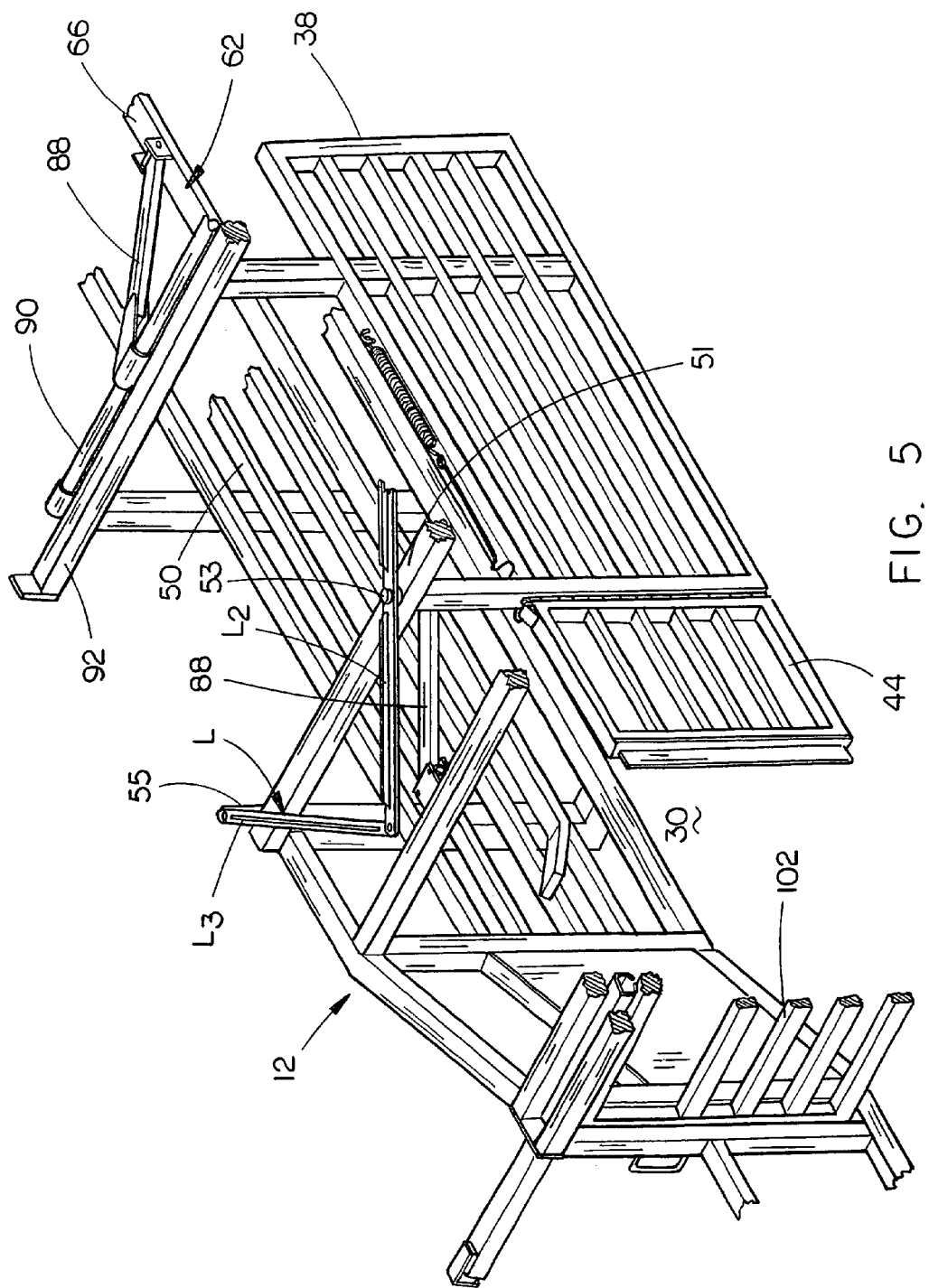
FIG. 5 is a partial front perspective view of the second alley of this invention.

Alley 28 includes an upstanding and vertically disposed outer side wall 46 which is pivotally connected to main frame 12 by means of arms or brackets 48 to enable the outer side wall 46 to be selectively horizontally adjusted with respect to the side of main frame 12 at the rearward end thereof. Similarly, alley 30 is provided with an outer side wall 50 pivotally secured to main frame 12 by a plurality of pivotal arms 52 as illustrated in FIG. 7. The outer end of one of the pivotal arms 48 is secured to a vertically extending pipe or shaft 49 which is rotatably mounted on an upstanding frame member F of main frame 12. The upper end of frame member F has a three-piece linkage L connected thereto which is comprised of links $L_1$, $L_2$, and $L_3$ which are pivotally secured together with link $L_2$ being pivotally connected to the beam or frame member 51 of main frame 12 at 53 as seen in FIGS. 2 and 5. The outer end of link $L_3$ is secured to a vertically disposed rotatable pipe or shaft 55 which is secured to main frame 12. The lower end of pipe or shaft 55 is connected to one of the arms 52.

Outer side walls 46 of alley 28 are selectively horizontally adjustable by means of a length adjustable crank jack 56 which extends between wall 46 and main frame 12. Extension of the jack 56 will cause the wall 46 to move toward the center of the alley to reduce the width thereof. As wall 46 moves inwardly, the arm 48 which is connected to pipe 49 will cause pipe 49 to rotate which in turn causes pipe 55 to rotate through linkage L which causes outer wall 50 of alley 30 to also move towards the center of alley 30 to reduce the width thereof simultaneously with the movement of wall 46. Conversely, retraction of the jack 56 will simultaneously cause the outer walls 46 and 50 of alleys 28 and 30 to move outwardly to increase the width of the alleys 26 and 30. The adjustability of walls 46 and 50 permits the alleys 28 and 30 to accommodate animals of various sizes. The entrance ends of outer side walls 46 and 50 are flared outwardly at 57 and 58 respectively to facilitate the entrance of an animal into the respective alley.

Figure 12:
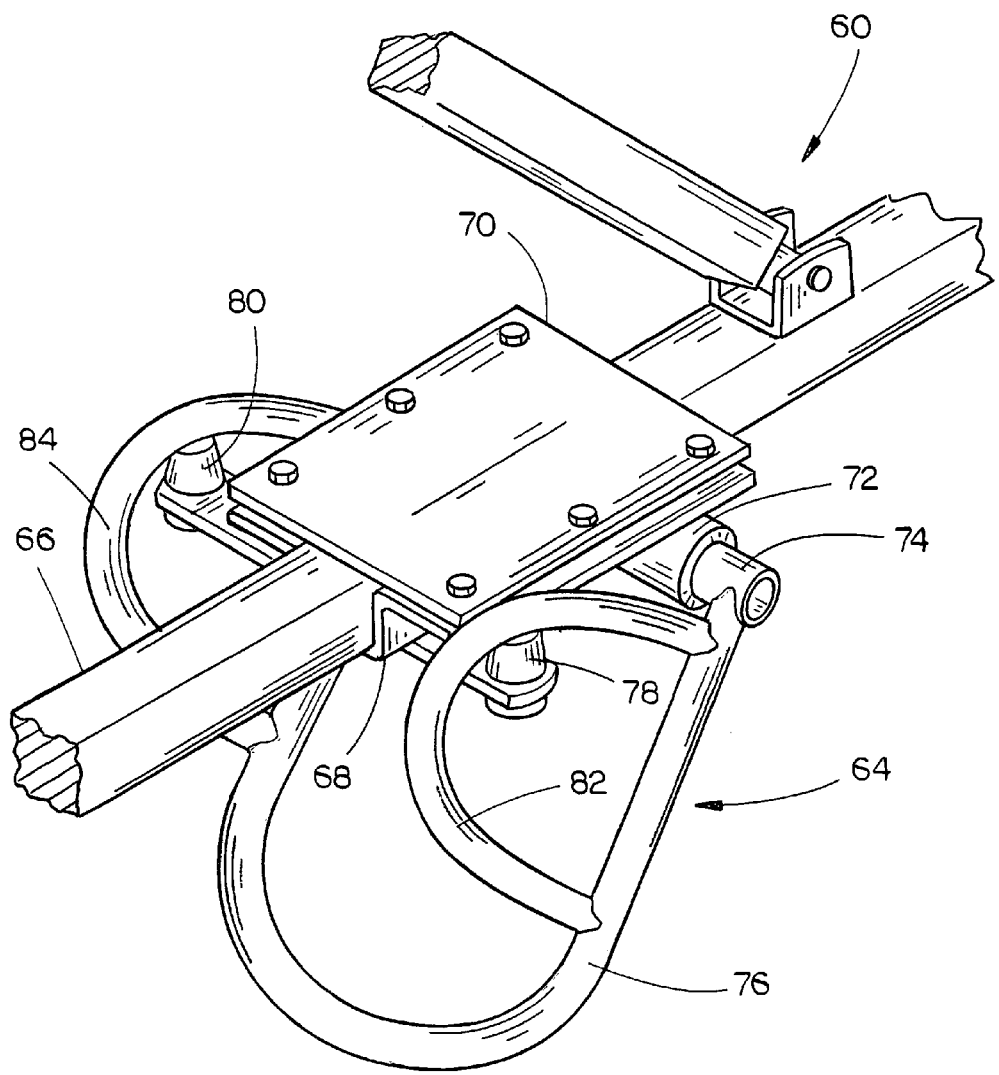
FIG. 12 is a partial perspective view of a portion of the rear-up preventer mechanism.
Figure 13:
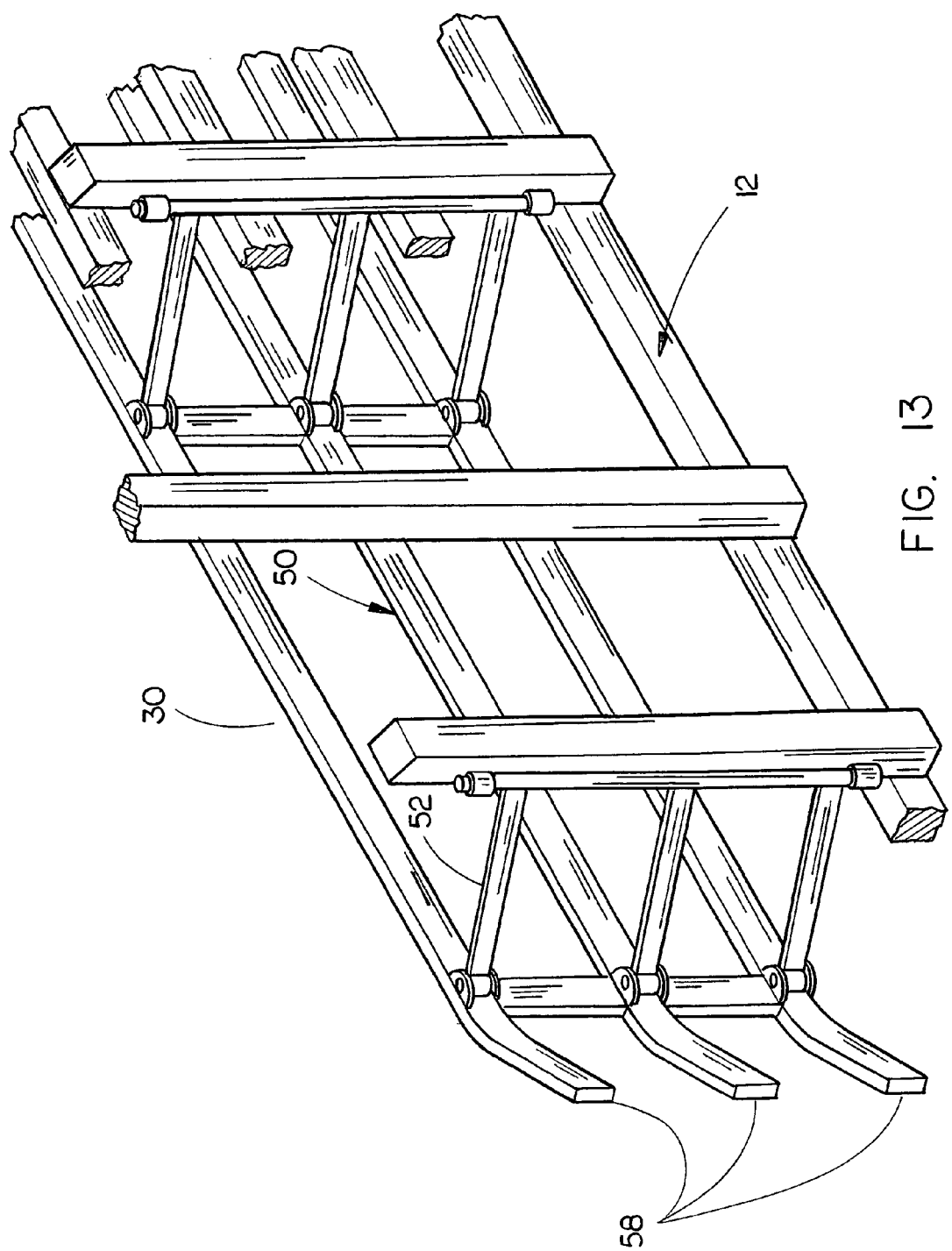
FIG. 13 is a partial rear perspective view illustrating the manner in which the side wall of the first alley is selectively horizontally adjustable to accommodate various sizes of animals.

The numeral 60 refers to a rear-up preventer mechanism which is positioned at the upper end of alley 28 while the numeral 62 refers to a rear-up preventer mechanism located in the upper portion of alley 30. Each of the rear-up preventer mechanisms 60 and 62 include a plurality of horizontally spaced rear-up preventer devices 64. The devices 64 are selectively longitudinally mounted on supporting beam 66 by means of clamps 68 and 70. The preventer devices 64 are not shown in FIG. 5 for purposes of clarity. As seen in FIG. 12, pipe 72 is secured to clamp 68 and has a shaft 74 rotatably mounted therein. A U-shaped member 76 is secured to the opposite ends of the shaft 74 as illustrated in FIG. 2. Bumper stops 78 and 80 are operatively secured to clamp 68 as illustrated in FIG. 2 and are in the pivotal path of the U-shaped members 82 and 84 which are secured to the legs of the member 76. The bumper stops 78 and 80 limit the downward pivotal movement of the member 76 with respect to the beam 66.

Figure 8:
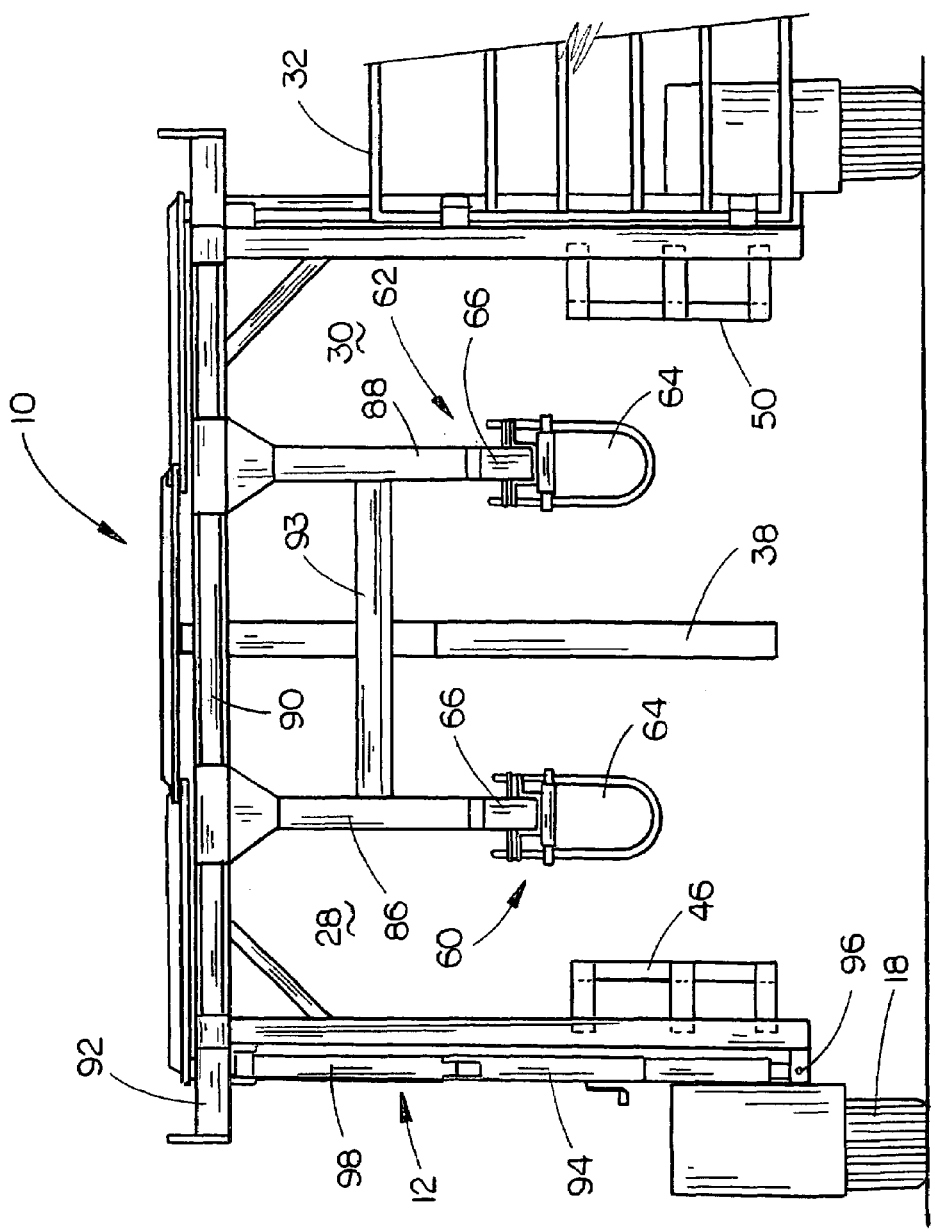
FIG. 8 is a rear view of the entrance end of the alley illustrating the first and second alleys positioned side-by-side.

At least a pair of arms 86 extend upwardly from beam 66 in alley 28 and at least a pair of arms 88 extend upwardly from beam 66 in alley 30 with the upper ends thereof being connected to a rotatable pipe or tube 90 which is rotatably secured to a cross-frame member 92. A support member 93 is secured to and extends between the arms 86 and 88 as seen in FIG. 8. The numeral 94 refers to a crank jack, which is secured to the main frame 12 at 96 with the upper end thereof being connected to a pivotal arm assembly 98 which is connected to one end of the pipe 90. Extension of the jack 94 causes the rear-up preventer mechanisms 60 and 62 to be raised within alleys 28 and 30 with the retraction of the jack 94 causing the rear-up preventer mechanisms 60 and 62 to be lowered within alleys 28 and 30 respectively.

The alley 10 includes a third alley 100 which extends forwardly from the exit ends of alleys 28 and 30, and which is adapted to receive the animals in a single file. As seen in the drawings, the width of alley 100 is less than the combined width of alleys 28 and 30. A slide gate assembly 102 is provided between the entrance end of alley 100 and the exit ends of alleys 28 and 30 for selectively closing and opening the entrance end of alley 100 from either side of the alley 10.

Figure 10:
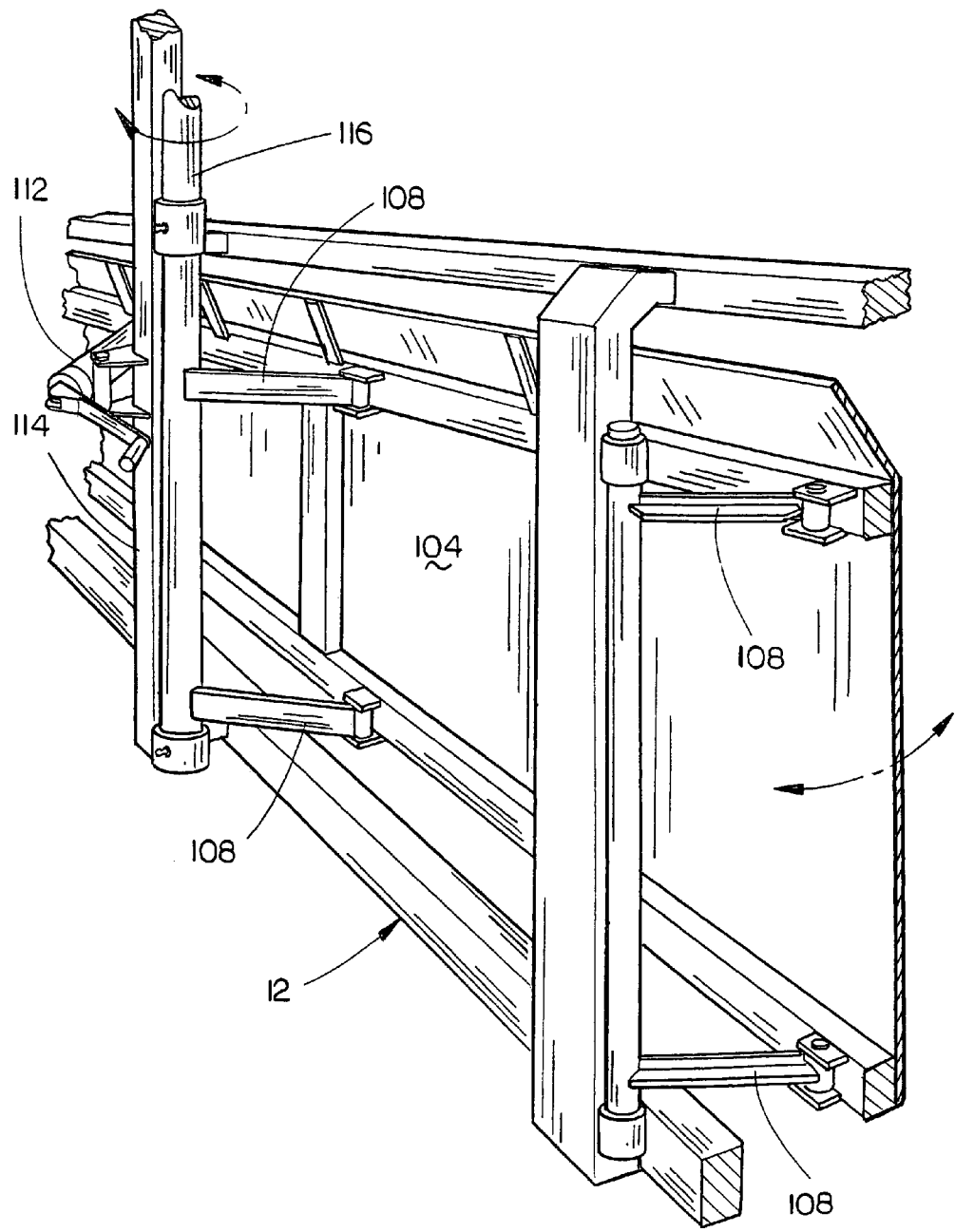
FIG. 10 is a partial rear perspective view illustrating the manner in which the outer side wall of the third alley is horizontally adjustable to accommodate various sizes of animals.
Figure 11:
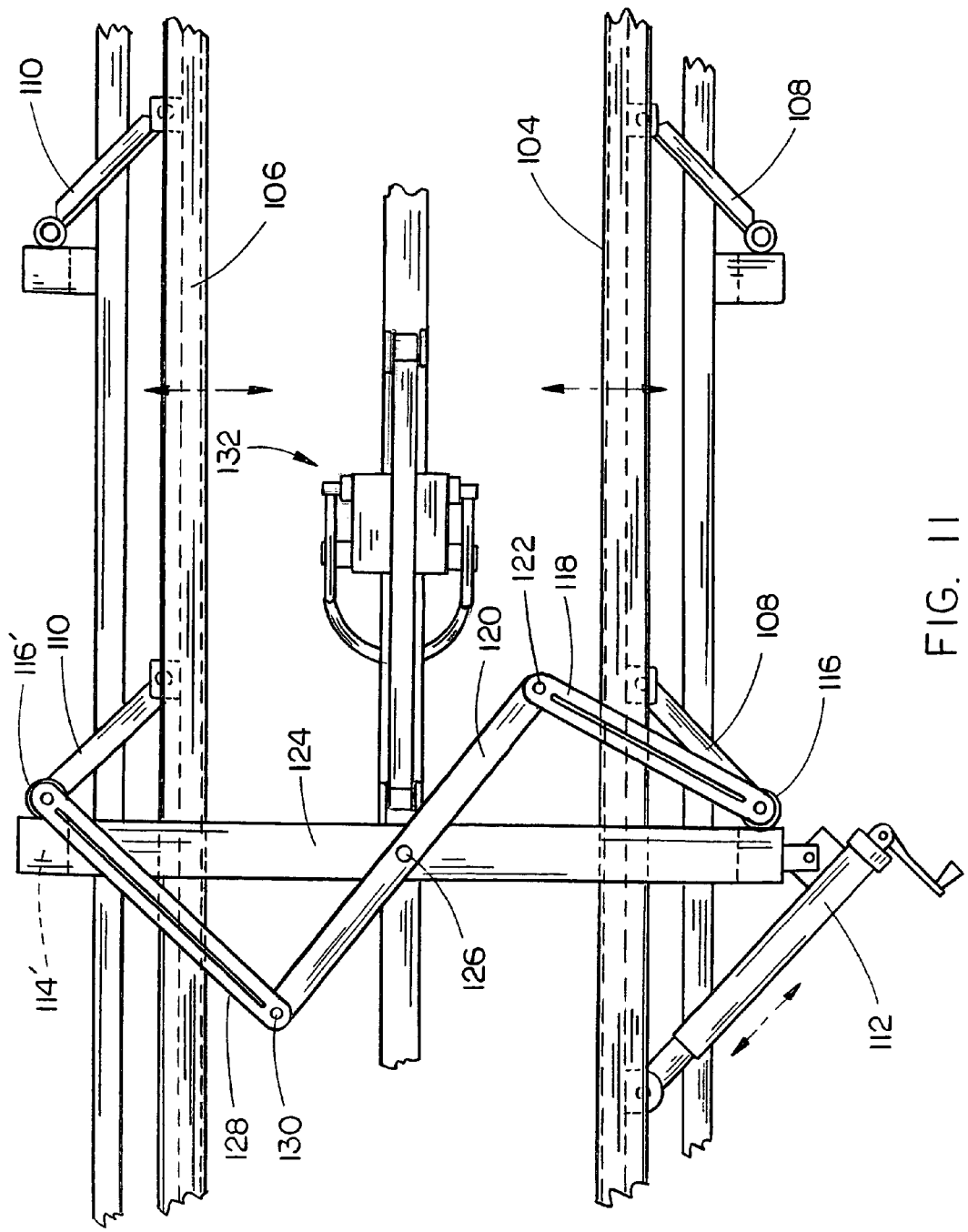
FIG. 11 is a partial top elevational view illustrating the manner in which the side walls of the third alley are selectively horizontally adjustable to accommodate various sizes of animals.

Alley 100 includes outer side walls 104 and 106 which are positioned inwardly of the side walls of the main frame 12 and are selectively pivotally movable towards and away from the side walls of the main frame 12 to either decrease of increase the width of the alley 30. Outer side wall 104 is supported by a plurality of pivotal arms 108 extending between wall 104 and the side frame 12 while outer wall 106 is pivotally movable and supported by a plurality of pivotal arms 110 secured to and extending between wall 106 and main frame 12. Jack 112 has its base end secured to an upright 114 which is a part of the main frame 12 and which has its rod end pivotally secured to wall 104. As seen in FIG. 10, at least two of the arms 108 are rigidly secured at their outer ends to a shaft 116 which is rotatable with respect to the upright 114. Thus, extension and retraction of the jack 112 causes wall 104 to move inwardly with respect to frame 12 or outwardly towards frame 12 respectively.

The upper end of pipe or shaft 116 has a link arm 118 rigidly secured thereto. The inner end of link arm 118 is pivotally secured to a link arm 120 at 122, with the link arm 120 being secured to the cross member 124 of main frame 12 at 126. One end of link arm 120 is pivotally connected to link arm 128 at 130. The other end of link arm 128 is rigidly secured to the upper end of a pipe or shaft 116 which is rotatably secured to the upright 114 in the same fashion as shaft 116 is secured to upright 114. The lower end of the shaft 116 is rigidly secured to a pair of the pivotal arms 110 which are pivotally connected to the outer wall 106. Thus, extension and retraction of the jack 112 will cause the walls 104 and 106 to move simultaneously inwardly towards one another or outwardly away from one another through the linkage just described which connects the two walls 104 and 106.

Figure 9:
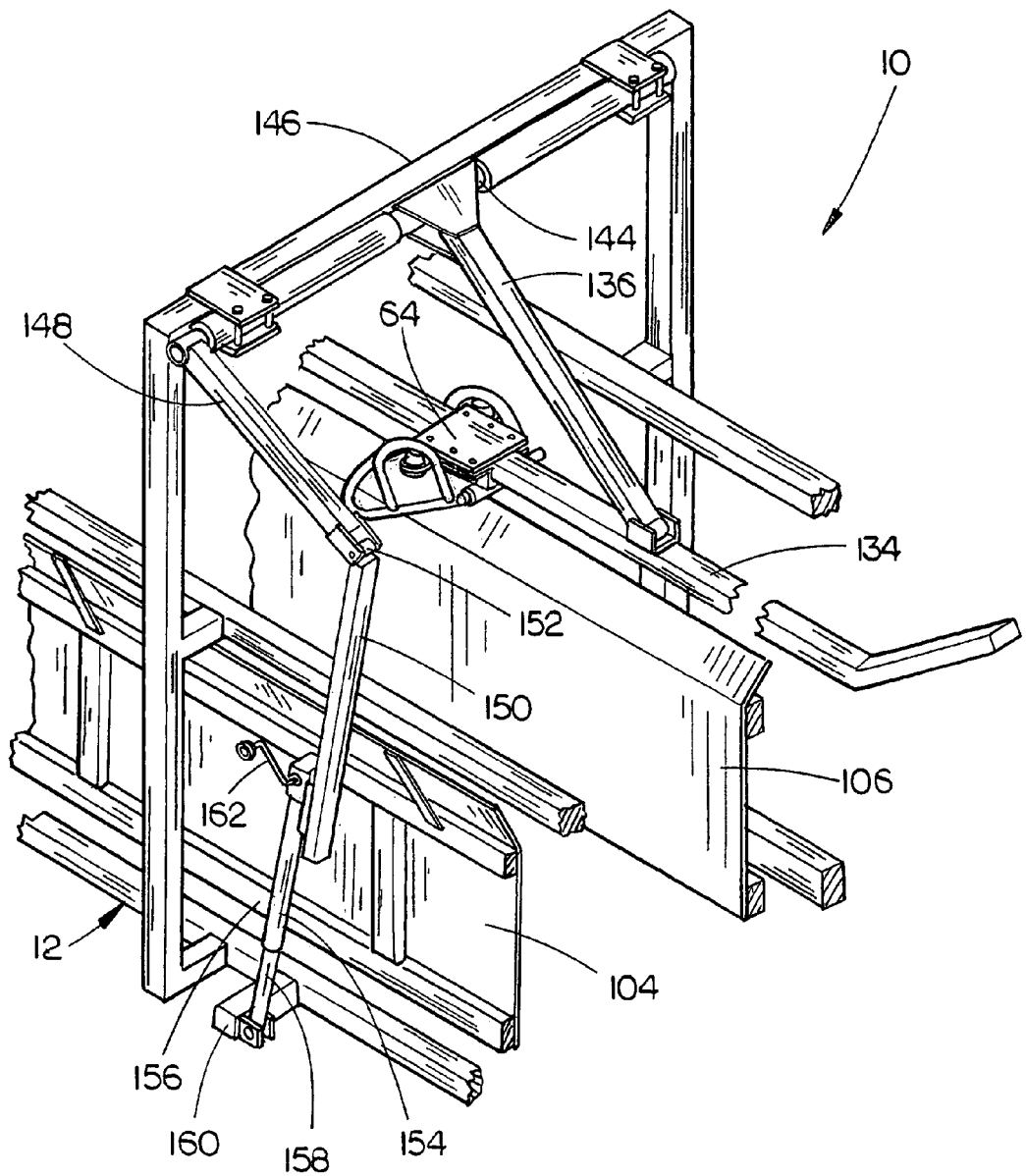
FIG. 9 is a partial rear perspective view illustrating the manner in which the rear-up preventer mechanism is vertically adjustable with respect to the third alley.
Figure 14:
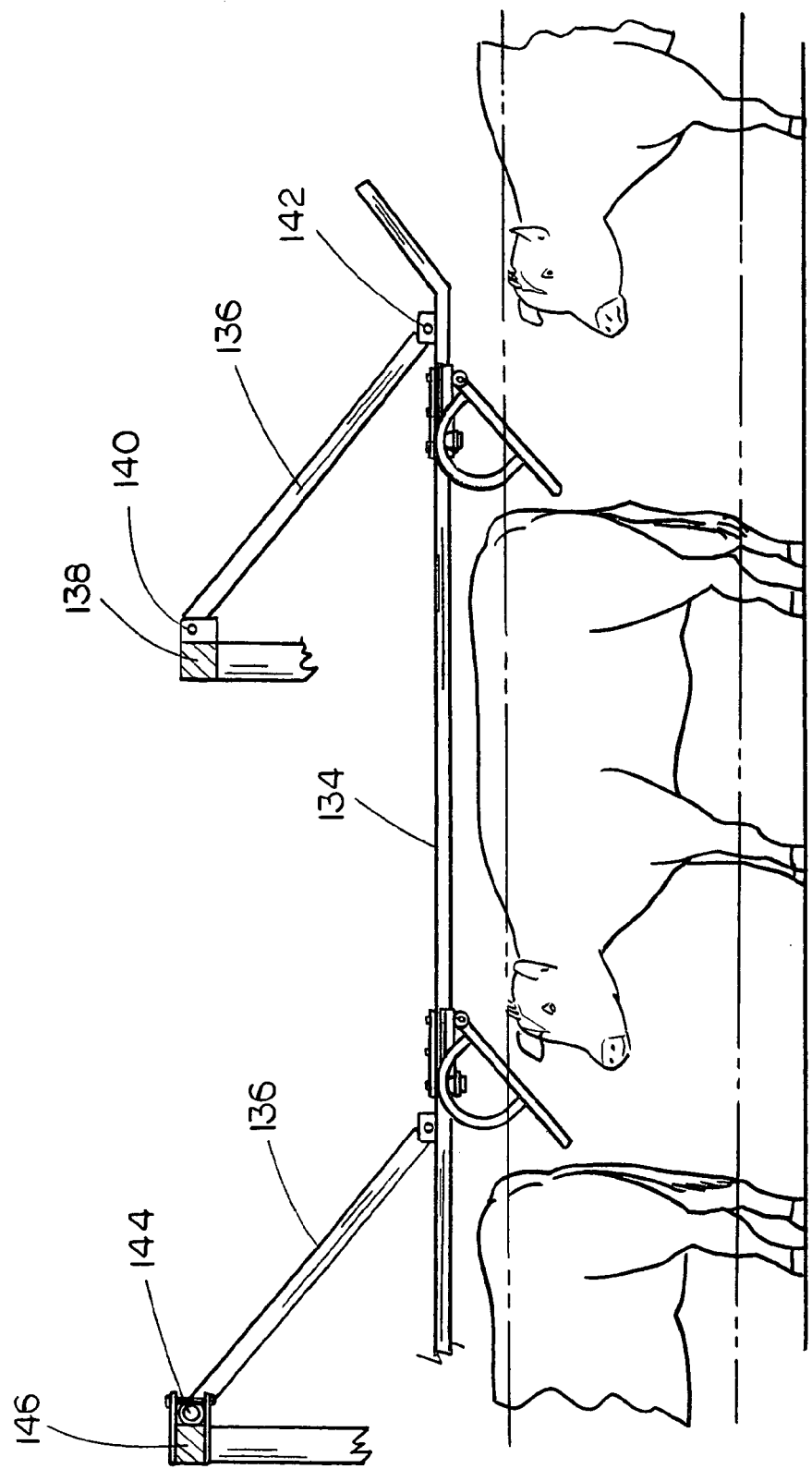
FIG. 14 is a partial side view illustrating the manner in which the rear-up preventer mechanism in the third alley functions and is vertically adjustable.

The numeral 132 refers generally to a rear-up preventer mechanism which is positioned at the upper end of alley 100. Rear-up preventer mechanism 132 is substantially identical to rear-up preventer mechanisms 60 and 62 except for the particular way that it is mounted. Preventer mechanism 132 includes a longitudinally extending beam 134 which is supported by a plurality of arms 136 which have the lower ends thereof pivotally secured to the beam 134 and which have their upper ends operatively secured to the main frame 12 as will now be described. The rearward-most arm 136 is pivotally connected to a crossbeam 138 of the main frame 12 at 140 (FIG. 14). The lower end of the rearward-most arm 36 is pivotally connected to the beam 134 at 142. One of the arms 136 is secured to a pipe or shaft 144 which is rotatably secured to a cross member 146 of the main frame 12 as illustrated in FIG. 9. An elongated arm 148 is secured to one end of the shaft 144 and has an elongated arm 150 pivotally secured to the other end thereof at 152. The lower end of arm 150 is operatively secured to the body 154 of jack 156. The rod end of jack 156 is pivotally secured to a stub 160 which extends laterally from the main frame 12 as illustrated in FIG. 9. Upon extension of the rod 154 from the jack 156 by means of the crank 162, arm 150 is raised which causes arm 148 to be raised which causes shaft 144 to be rotated in a counterclockwise direction as viewed in FIG. 6 which will cause the rearward-most arm 136 to rotate upwardly which causes beam 134 to rotate upwardly. A plurality of preventer devices 64 are secured to the beam 134 in a horizontally spaced-apart relationship in the same manner as the devices 64 are secured to the beam 66 in alleys 28 and 30.

The numeral 164 refers to a slide gate which may be horizontally moved between open and closed positions to selectively open and close the exit end of alley 100 as viewed in FIG. 6. If desired, a head gate may be mounted at the forward end of the alley 100 to grasp the head of an animal to maintain the animal in position for vaccinations, pregnancy testing, artificial insemination, etc.

Figure 3:
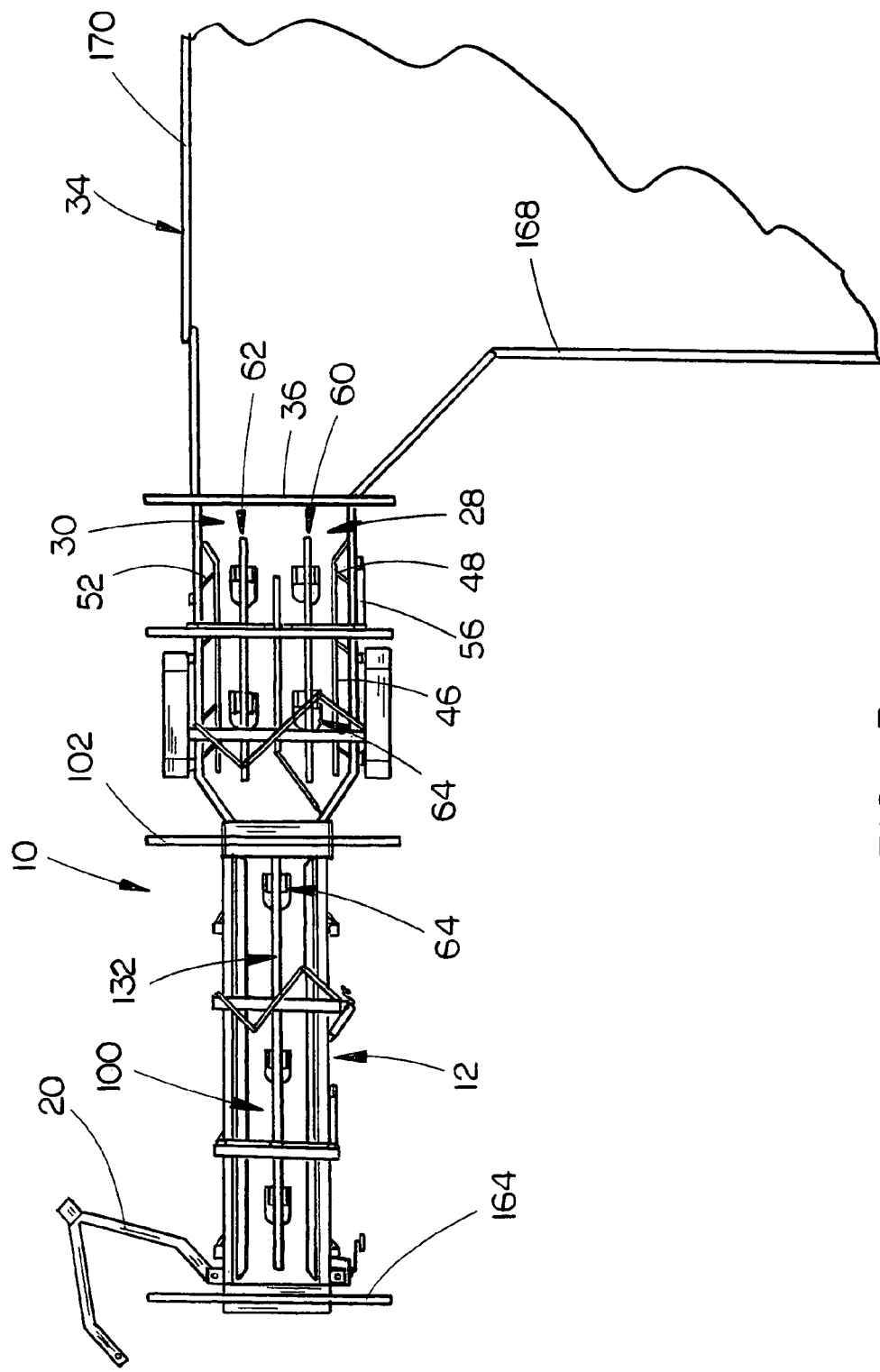
FIG. 3 is a top view of the alley in operation being used with a bud box enclosure.
Figure 4:
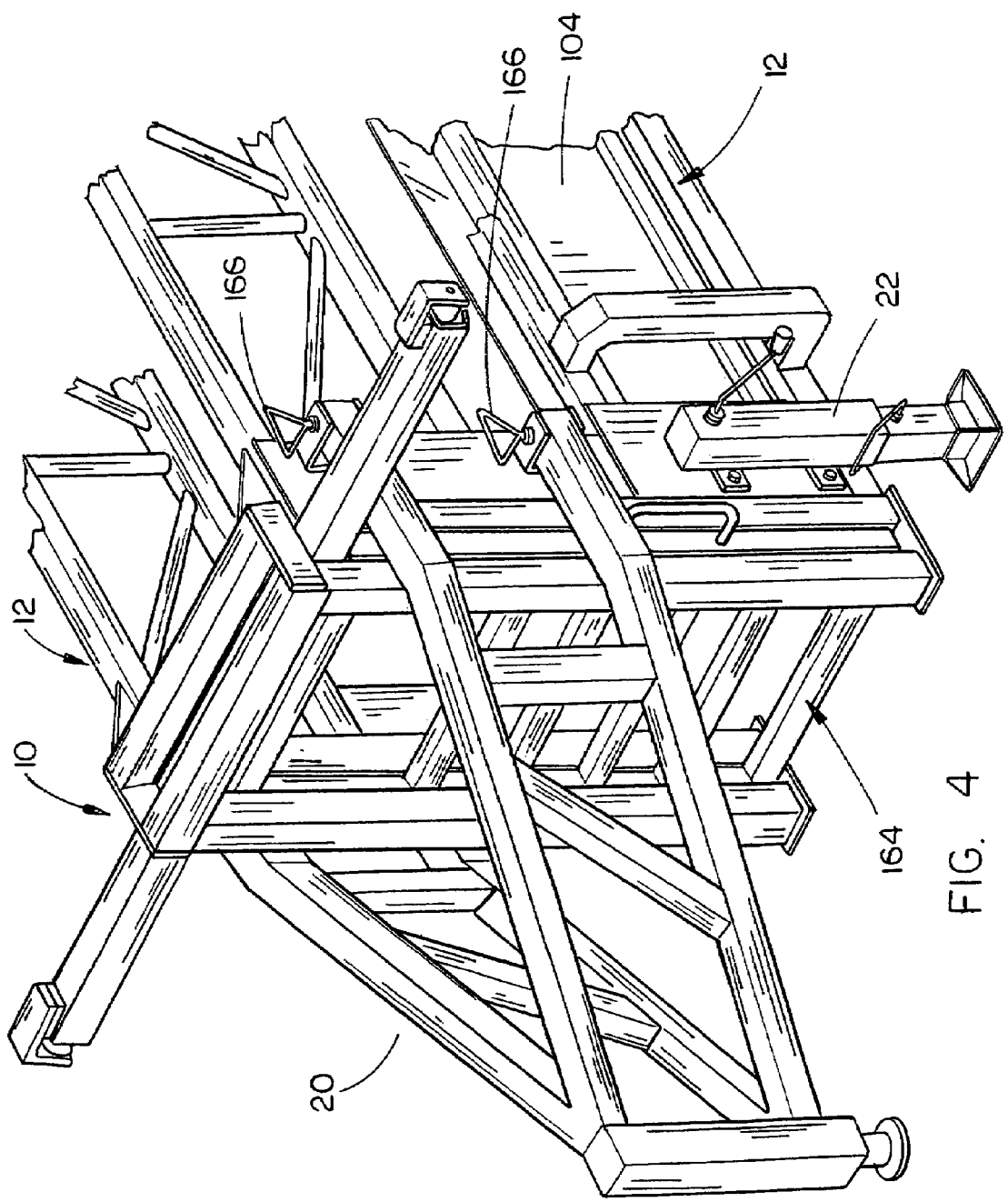
FIG. 4 is a front perspective view of the exit end of the third alley with the exit end thereof being selectively closed by a slide gate.

The alley 10 is utilized as follows. Assuming that the alley 10 is a portable alley, the hitch device 20 will normally be secured to a truck or the like and will be towed to the desired location. When the alley 10 has been placed in the proper location, the jacks 22 and 24 will be simultaneously lowered to support the forward end of the alley 10 to enable the hitch device 20 to be disconnected from the truck. When the hitch device 20 is disconnected from the truck, the hitch 20 may be pivotally moved from the position of FIGS. 1 and 2 to the position of FIG. 3. This is possible because one end of the hitch device 20 is selectively movably secured to the main frame 12 by a plurality of pins extending through one end of the hitch device 20 with the other end of the hitch device 20 being pivotally secured to the main frame 12. When the pins 166 are removed, the hitch device 20 may be pivotally moved to the open position of FIG. 3 so that the exit end of the alley 10 is unobstructed.

The bud box 34 will then normally be constructed which includes a plurality of panels 168 connected together. Normally, a gate 170 will be provided in the bud box 34 to permit the animals to enter the interior of the bud box 34. Once the animals are in the bud box 34, the gate 170 will be closed. The animals upon entering the bud box 34 always tend to return to the opening from which they entered the bud box and with the gate 170 being closed, they will move to the open entrance end of the alleys 28 and 30 since the panel 36 will be opened. The side-by-side positioning of the alleys 28 and 30 enable pairs of animals to enter the alleys 28 and 30 substantially simultaneously which has been proven to greatly facilitate the entry of the animals into the alley since they are side-by-side with another animal. As the animals enter the alleys 28 and 30, and move toward the exit end thereof, they pass beneath the pivotal preventer devices 64 which will have been previously vertically adjusted to accommodate the particular size of animals being handled, with the head and shoulders of the animal sometimes engaging the U-shaped member 76 which pivotally move upwardly to permit the passage of the animal thereby. Once the head and front shoulders of the animal have passed the U-shaped member 76, the U-shaped member 76 will return to its normal position which is illustrated in FIG. 12, the downward movement of the same being limited by the bumpers 78 and 80. Should the animal become frightened and try to rear-up, the preventer devices 64 as well as the beams 66 will prevent the animal from raring up and falling over backwards.

When the animals reach the exit end of the alleys 28 and 30, the spring-loaded gate 44 moves from side to side with respect to the divider wall 38 by the animals to open one of the alleys 28 or 30 and to close the other of the alleys 28 or 30. The selective opening and closing of the gate 44 converts the side-by-side relationship of two animals to become a single file of animals for passing through the gate 102 into the third alley 100. The rear-up preventer mechanism 132 in alley 100 functions in the same manner as the rear-up preventer mechanisms in alleys 28 and 30.

The side walls of the alleys 28, 30 and 100 are vertically disposed and are adjustable for any size of animal. The vertical disposition of the walls of the alleys let the animals stand naturally and do not restrict the animals from standing in the alley. This increases and ensures an easy, safe environment for cattle flow therethrough. The openness of the sides of the alleys permits the animals to see out both sides, so they flow therethrough more freely.

The system of this invention seems to be the most humane for both user and animals. The system of this invention is friendlier than any other product or system on the market today. With this system, applicant has doubled, and sometimes tripled the amount of animals that may be processed in a day. With the alley construction and the bud box style system, it also eliminates half of the workers that a person normally needs to employ to process animals.

In summary, the advantages of the present invention are that the same is cost effective, user and animal friendly, eliminates hot shots, reduces processing time, which in turn reduces stress levels in the animals, and reduces weight loss at processing time. Another important feature is employee safety which makes for a more efficient result for the producer and saves on labor costs. The system of this invention results in healthier cattle and employees, which have reduced Workman's Compensation liabilities and injuries to cattle and employees. This results in an enormous amount of savings in money.

Thus it can be seen that the invention accomplishes at least all of its stated objectives.

I claim:

1. An animal alley for handling animals such as cattle or buffaloes, comprising:
    a frame including an entrance end and an exit end;
    said entrance end of said frame having first and second spaced-apart infeed alleys, having an entrance end and an exit end, outer side walls and a divider wall therebetween so that two animals may enter the entrance ends of the first and second infeed alleys in a side-by-side manner;
    a swinging gate at the exit ends of said first and second infeed alleys which selectively closes either the exit end of said first infeed alley or the exit end of said second infeed alley;
    said frame including a first framework which extends over the upper end of said first and second infeed alleys;
    a first animal rear-up preventer mechanism secured to said first framework above said first infeed alley so that an animal in said first infeed alley cannot rear up over backwards;
    a second animal rear-up preventer mechanism secured to said first framework above said second infeed alley so that an animal in said second infeed alley cannot rear up over backwards;
    said frame also including a third alley, having an entrance end and an exit end;
    said entrance end of said third alley communicating with the exit ends of said first and second infeed alleys;
    said third alley having a width which is less than the combined width of said first and second infeed alleys;
    said third alley including spaced-apart outer side walls;
    said frame including a second framework which extends over the upper end of said third alley;
    a third animal rear-up preventer mechanism secured to said second framework above said third alley so that an animal in said third alley cannot rear up over backwards; and
    said frame including a gate which selectively closes said exit end of said third alley.

2. The animal alley of claim 1 wherein said first, second and third animal rear-up preventer mechanisms are selectively vertically adjustable to accommodate various sizes of animals.

3. The animal alley of claim 1 wherein said outer side walls of said first and second infeed alleys are selectively horizontally adjustable to accommodate various sizes of animal.

4. The animal alley of claim 3 wherein said outer side walls of said first and second infeed alleys are operatively interconnected so that they may be simultaneously adjusted.

5. The animal alley of claim 1 wherein said alley is portable.

6. The animal alley of claim 5 wherein a hitch mechanism is movably secured to said exit end of said frame.

7. The animal alley of claim 6 wherein said hitch mechanism is selectively pivotally secured to said frame so that said hitch mechanism may be selectively pivotally moved to one side of the exit end of said frame.

8. The animal alley of claim 5 wherein said frame is supported by a plurality of jacks.

9. The animal alley of claim 8 wherein at least some of said jacks are selectively interconnected to enable said jacks to be simultaneously operated.

10. The animal alley of claim 1 further including a gate which selectively closes the entrance end of said first and second alleys.

11. The animal alley of claim 1 wherein said outer side walls of said third alley are selectively horizontally adjustable so as to accommodate animals of various sizes.

12. The animal alley of claim 1 wherein said outer side walls of said third alley are operatively connected so that they may be simultaneously adjusted.

13. The animal alley of claim 11 wherein said outer side walls of said third alley are operatively connected by a pivotal linkage so that they may be simultaneously adjusted.

14. An animal alley for handling animals such as cattle or buffaloes, comprising:
    a frame including an entrance end and an exit end;
    said entrance end of said frame having first and second spaced-apart infeed alleys, having an entrance end and an exit end, outer side walls and a divider wall therebetween so that two animals may enter the entrance ends of the first and second infeed alleys in a side-by-side manner;
    said frame including a first framework which extends over the upper end of said first and second infeed alleys;
    a first animal rear-up preventer mechanism secured to said first framework above said first infeed alley so that an animal in said first infeed alley cannot rear up over backwards;
    a second animal rear-up preventer mechanism secured to said first framework above said second infeed alley so that an animal in said second infeed alley cannot rear up over backwards;
    said frame also including a third alley, having an entrance end and an exit end;
    said entrance end of said third alley communicating with the exit ends of said first and second infeed alleys;

said third alley having a width which is less than the combined width of said first and second infeed alleys;
a gate assembly at the exit ends of said first and second infeed alleys which permits only a single animal to exit from the first and second infeed alleys and enter said entrance end of said third alley;
said third alley including spaced-apart outer side walls;
said frame including a second framework which extends over the upper end of said third alley;

a third animal rear-up preventer mechanism secured to said second framework above said third alley so that an animal in said third alley cannot rear up over backwards; and
said frame including a gate which selectively closes said exit end of said third alley.

* * * * *